United States Patent
Samida et al.

[11] Patent Number: 6,123,792
[45] Date of Patent: Sep. 26, 2000

[54] METHODS AND APPARATUS FOR INTERMITTENT ROTARY ULTRASONIC BONDING SYSTEM

[75] Inventors: Jeffrey Joseph Samida, Appleton; Robin Kurt Nason, Oshkosh; Daniel Hoo, Appleton; Chris Lee Heikkinen; Jack Lee Couillard, both of Menasha; Chinmay Suresh Betrabet, Neenah; James Melvin Gaestel, Seymour; Paul Gordon Klemp, Hortonville, all of Wis.

[73] Assignee: Kimberly-Clark Worldwide, Inc., Neenah, Wis.

[21] Appl. No.: 09/134,853

[22] Filed: Aug. 14, 1998

[51] Int. Cl.[7] ..................................................... B32B 31/00
[52] U.S. Cl. ..................... 156/73.1; 156/290; 156/308.4; 156/553; 156/580.2
[58] Field of Search ................... 156/73.1, 290, 156/308.2, 308.4, 553, 555, 580.1, 580.2, 582; 264/442, 443, 444; 425/174.2

[56] References Cited

U.S. PATENT DOCUMENTS

| | | | |
|---|---|---|---|
| 3,562,041 | 2/1971 | Robertson | 156/73 |
| 3,733,238 | 5/1973 | Long et al. | 156/580 |
| 4,083,737 | 4/1978 | Foote, Jr. et al. | 156/73.1 |
| 4,313,778 | 2/1982 | Mims | 156/358 |
| 4,400,227 | 8/1983 | Riemersma | 156/73.1 |
| 4,404,052 | 9/1983 | Persson et al. | 156/73.1 |
| 4,517,790 | 5/1985 | Kraeger | 53/552 |
| 4,693,771 | 9/1987 | Payet et al. | 156/73.3 |
| 4,711,693 | 12/1987 | Holze, Jr. | 156/580.1 |
| 4,749,437 | 6/1988 | Welter | 156/580.1 |
| 4,784,591 | 11/1988 | Ackermann | 425/116 |
| 5,421,924 | 6/1995 | Ziegelhoffer et al. | 156/73.1 |
| 5,433,816 | 7/1995 | Stewart et al. | 156/510 |
| 5,520,774 | 5/1996 | Palacios et al. | 156/580.1 |
| 5,545,275 | 8/1996 | Herrin et al. | 156/731 |
| 5,562,790 | 10/1996 | Ehlert et al. | 156/73.1 |
| 5,658,408 | 8/1997 | Frantz et al. | 156/64 |
| 5,707,483 | 1/1998 | Nayar et al. | 156/580.2 |
| 5,711,847 | 1/1998 | Rajala et al. | 156/580.2 |
| 5,733,411 | 3/1998 | Bett | 156/580.2 |
| 5,817,199 | 10/1998 | Brennecke et al. | 156/73.1 |
| 5,871,605 | 2/1999 | Bett | 156/73.1 |
| 6,059,923 | 5/2000 | Gopalakrishna | 156/580.2 |

*Primary Examiner*—James Sells
*Attorney, Agent, or Firm*—Thomas D. Wilhelm

[57] ABSTRACT

This invention relates to apparatus and methods for intermittently bonding a substrate web in fabricating a blank subassembly for an absorbent article. The invention comprises ultrasonic bonding apparatus including an anvil roll, a substrate web thereon, and at least one rotary ultrasonic horn. The substrate web can comprise at least first and second layers of material. The rotary ultrasonic horn, in combination with the anvil roll, ultrasonically bonds intermittent segments of the first and second layers of the substrate web to each other. Such intermittent bonds can comprise end seals for the absorbent articles. The ultrasonic horn and anvil roll are periodically separated from each other to provide the intermittent bonding of the substrate web. An actuator apparatus periodically moves the anvil roll and ultrasonic horn from engaging contact with each other preventing bond formation. The actuator apparatus can include a cam mechanism moving one of the anvil roll and ultrasonic horn from engaging contact with the other during rotation of the rotary ultrasonic horn. The cam mechanism can create a physical gap between the ultrasonic horn and the anvil roll. The cam mechanism moves either the ultrasonic horn and the anvil roll toward the other of the ultrasonic horn and anvil roll at a velocity of no more than about 80 millimeters/second to prevent bounce or impact loading when the horn and anvil roll are in engaging contact. The anvil roll comprises a substrate-receiving surface generally moving the substrate web through the nip at a surface speed of at least 300 meters per minute. The ultrasonic system generally creates bonds between the first and second layers of the substrate web at least about 600 times per minute.

39 Claims, 7 Drawing Sheets

METHODS AND APPARATUS FOR INTERMITTENT ROTARY ULTRASONIC BONDING SYSTEM

FIELD OF THE INVENTION

The present invention relates to methods and apparatus for bonding webs to each other. More particularly, the invention relates to ultrasonic bonding of webs using ultrasonic horns and anvils having corresponding nips therebetween. At least one of the ultrasonic horns and anvils is movable with respect to the other, such that the horn and anvil intermittently bond a web traveling through the nip.

BACKGROUND OF THE INVENTION

Ultrasonic bonders are known in the art. Stationary plunge-horn ultrasonic bonders are limited to operating on webs traveling at low speeds because, among other reasons, at higher web speeds, the web being operated on tends to pile up, or bunch up, at the leading edge of the plunge-type stationary ultrasonic horn.

Some known ultrasonic bonders provide end seals for articles by using plunge type ultrasonic horns. The plunge type ultrasonic horns lift up from the anvil a distance sufficient to enable an article, generally containing a product, to pass thereby.

Many ultrasonic bonders maintain the ultrasonic horn in engaging contact with the anvil continuously, whether or not bonding occurs. Such an arrangement decreases the probability of damage to the horn or anvil due to bounce or chatter from the force of the horn and anvil recontacting one another after being separated from each other. The web speed for such a system generally is less than about 150 meters/minute. Typical production speeds for ultrasonic bonders are on the order of 10–30 meters/minute.

SUMMARY OF THE DISCLOSURE

The present invention relates to methods and systems for intermittently bonding webs, including composite multiple-layer webs, and focuses on intermittently bonding such webs by utilizing an actuator apparatus to periodically move one of an ultrasonic horn and/or anvil roll toward and away from the other of the ultrasonic horn and the anvil roll.

In a first family of embodiments, the invention comprehends an ultrasonic system, comprising an ultrasonic horn having a first outer radial surface extending about at least a substantial portion of a circumference thereof, an anvil roll having a second outer radial surface extending about at least a substantial portion of a circumference thereof, the anvil roll having a substrate receiving surface for receiving a substrate web to be worked by ultrasonic energy, the substrate receiving surface cooperating with the ultrasonic horn to form a close relationship comprising a nip between the ultrasonic horn and the anvil roll for passage of the substrate web therethrough, and actuator apparatus arranged to interact with the ultrasonic horn and the anvil roll, and, during operation of the ultrasonic system, to assist in positioning the first outer radial surface of the ultrasonic horn substantially in engaging contact with the anvil roll, thereby to bond the substrate web passing the first outer radial surface, the actuator apparatus periodically displacing the first outer radial surface of the ultrasonic horn from the engaging contact with the anvil roll, thus creating a physical gap between the ultrasonic horn and the substrate web on the anvil roll, and subsequently returning the ultrasonic horn to the anvil roll, and thereby reestablishing the engaging contact with the anvil roll.

In some embodiments, the maximum physical gap comprises no more than about 2 millimeters.

In preferred embodiments, the ultrasonic horn has a central axis of rotation substantially centered with respect to the circumference of the ultrasonic horn, and the ultrasonic horn rotates about the central axis of rotation.

In preferred embodiments, the anvil roll has a central axis substantially centered with respect to the circumference of the anvil roll, and the anvil roll rotates about the central longitudinal axis.

In some embodiments, the substrate receiving surface travels at a surface speed of at least 300 meters/minute.

In some embodiments, the actuator apparatus comprises a cam mechanism, such as a cam track secured about a central longitudinal axis of the anvil roll, the cam track rotating when the anvil roll rotates. The cam mechanism can include cam follower(s), the cam follower(s) contacting the cam track to displace the ultrasonic horn from engaging contact with the anvil roll.

In other embodiments, the anvil roll includes a first gear thereon, the first gear rotating in response to rotation of the anvil roll and the actuator apparatus includes a second gear mounted to a first end of a shaft and an elliptically shaped cam mounted at a second end of the shaft, the second gear being rotatably responsive to the first gear, the cam periodically changing the position of the ultrasonic horn relative to the anvil roll in response to rotation of the first and second gears, thus to displace or re-establish the engaging contact between the ultrasonic horn and the anvil roll.

In some embodiments, the elliptically shaped cam can, during rotation of the cam, move the ultrasonic horn no more than about 2 millimeters away from the anvil roll. Thus, the cam preferably has a displacement of no more than 2 millimeters. and more preferably no more than 1 millimeter. When the first gear and the second gear move away from each other in response to the cam shifting the position of the ultrasonic horn, teeth of the first gear continue to contact and drive teeth of the second gear while the first and second gears are thus moved away from each other.

In preferred embodiments, the first outer radial surface of the ultrasonic horn defines a substantially constant radius extending substantially about the circumference thereof.

In preferred embodiments, the second outer radial surface of the anvil roll defines a substantially constant radius extending substantially about the circumference thereof.

In embodiments where the anvil roll is in a fixed position, the actuator apparatus moves the ultrasonic horn relative to the anvil roll.

In embodiments where the ultrasonic horn is in a fixed position, the actuator apparatus moves the anvil roll relative to the ultrasonic horn.

In preferred embodiments, the ultrasonic horn rotates, and, in combination with the anvil roll, applies a compressive force to the substrate web in the nip during engaging contact.

In a second family of embodiments, the ultrasonic system comprises a rotary ultrasonic horn having a first central axis of rotation, an anvil roll having an outer radial surface comprising a substrate-moving surface. the anvil roll cooperating with the rotary ultrasonic horn to form a close relationship comprising a nip between the rotary ultrasonic horn and the anvil roll at the substrate-receiving surface, and cam apparatus periodically displacing the ultrasonic horn and the anvil roll from engaging contact with each other. thus creating a physical gap between the ultrasonic horn and the combination of the substrate web and the anvil roll, such that the ultrasonic horn intermittently bonds a substrate web traversing in the nip between the ultrasonic horn and the anvil roll.

In some embodiments, the ultrasonic system includes a load governor mechanism to relieve force on the ultrasonic horn when the force otherwise imposed on the ultrasonic horn is greater than about 900 Newtons (200 lb).

In some embodiments, the ultrasonic system includes a micro adjustment apparatus to vary the length of bonds as the substrate web moves through the nip in the machine direction.

In preferred embodiments, the maximum physical gap preferably comprises from about 0.2 millimeter to about 1 millimeter between the ultrasonic horn and the anvil roll, and most preferably 0.3 millimeter to 0.7 millimeter.

In a third family of embodiments, the ultrasonic system comprises a rotary ultrasonic horn, an anvil roll cooperating with the rotary ultrasonic horn to form a close relationship comprising a nip between the rotary ultrasonic horn and the anvil roll, and actuator apparatus arranged to periodically move one of the ultrasonic horn and the anvil roll away from the other of the ultrasonic horn and the anvil roll, thus creating a physical separation between the ultrasonic horn and the combination of the anvil roll and any substrate web on the anvil roll, the actuator apparatus returning the ultrasonic horn and the anvil roll into engaging contact, such that the ultrasonic system intermittently bonds the substrate web as the web traverses the nip between the ultrasonic horn and the anvil roll, and does not bond the substrate web when the ultrasonic horn and the anvil roll are thus separated from each other, the physical separation between the ultrasonic horn and the anvil roll, and the approach velocity of one of the ultrasonic horn and the anvil roll, controlled by the actuator apparatus, being such as to avoid harmful impact loading of the ultrasonic horn and the anvil roll.

In preferred embodiments, the approach velocity, at the instant of or immediately before contact between the ultrasonic horn and the anvil roll, preferably comprises no more than about 80 millimeters/second, more preferably no more than about 30 millimeters/second.

In preferred embodiments, the approach velocity of the actuator apparatus avoids deleterious bounce between the anvil roll and the ultrasonic horn, thereby enhancing useful life of the anvil roll and the ultrasonic horn.

In a fourth family of embodiments, a method of creating bonds on a substrate web comprises positioning absorbent cores between and along the length of a generally endless substrate web comprising a first outer cover layer and a second bodyside liner layer, the absorbent cores being spaced apart a predetermined distance along the length of the web, receiving the substrate web at an anvil roll and transferring the substrate web thereabout, outputting ultrasonic energy from an ultrasonic horn to the substrate web between the ultrasonic horn and the anvil roll, thus bonding the bodyside liner layer and the outer cover layer to each other, and intermittently creating a physical gap between the ultrasonic horn and the substrate web on the anvil roll, such that regions of the substrate web containing respective ones of the absorbent cores are not bonded by ultrasonic energy.

In some embodiments of the method, the anvil roll rotates about a central axis and includes recessed areas corresponding to, and receiving spaced discrete absorbent cores located along the length of the substrate web, such that the top surface of the substrate web maintains a substantially constant radius about the central axis of the anvil roll.

In some embodiments, the method includes feeding the substrate web through the nip at a velocity of at least 300 meters per minute.

In some embodiments, bonding of the layers of the substrate web occurs at positions corresponding to end seals on either side of the absorbent cores along the length of the substrate web.

In a fifth family of embodiments, the invention includes a process for securing layers of a substrate web comprising, outputting ultrasonic energy from a rotary ultrasonic horn, receiving the substrate web to be worked by ultrasonic energy at a substrate web receiving surface of an anvil roll, positioning the first outer radial surface of the ultrasonic horn in engaging contact with the substrate web receiving surface of the anvil roll, thereby bonding the layers of the substrate passing through the nip, and periodically displacing a first outer radial surface of the ultrasonic horn from the engaging contact with the anvil roll, and subsequently returning the ultrasonic horn to the anvil roll, and thereby re-establishing the engaging contact with the anvil roll.

In some embodiments of the process, the layers of the substrate web comprise a first outer cover layer and a second bodyside liner layer, the method preferably intermittently creating bonds between the first and second layers at least about 600 times per minute.

Figure 1:
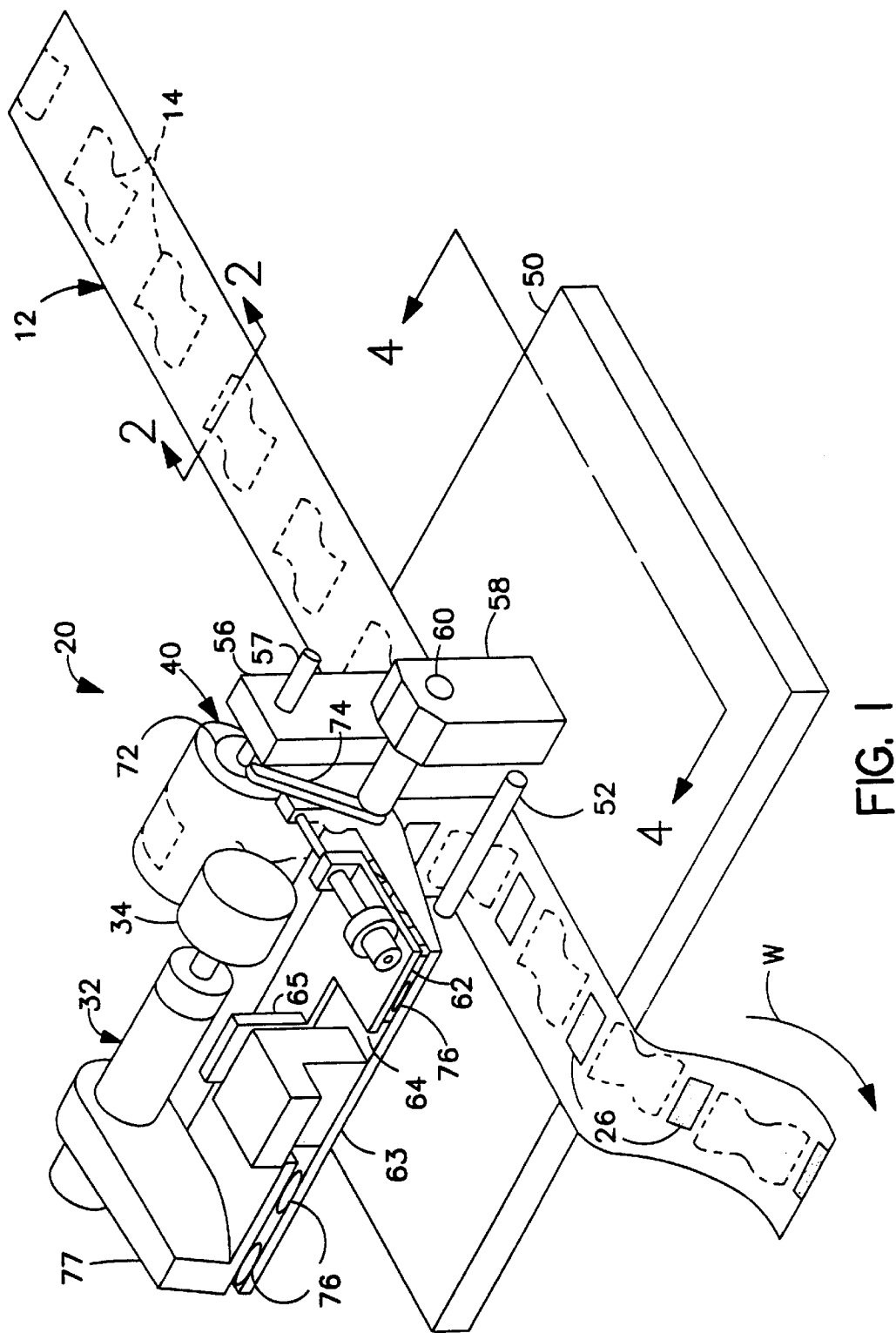
FIG. 1 shows a pictorial view of an ultrasonic bonding system of the invention. For purposes of illustration, the view does not include back-up rolls.

The invention is not limited in its application to the details of the construction and the arrangement of the components set forth in the following description or illustrated in the drawings. The invention is capable of other embodiments or of being practiced or carried out in various ways. Also, it is to be understood that the terminology and phraseology employed herein is for purpose of description and illustration and should not be regarded as limiting. Like reference numerals are used to indicate like components. Further, the above drawings are not drawn to scale and do not so limit the invention.

DETAILED DESCRIPTION OF THE ILLUSTRATED EMBODIMENTS

The present invention is directed toward apparatus and methods for fabricating a substrate by utilizing ultrasonic bonding where the substrate is traveling at a high speed. An exemplary method intermittently ultrasonically bonds first and second layers using an actuator apparatus, including a cam mechanism, to periodically separate an ultrasonic horn from an anvil.

Figure 2:
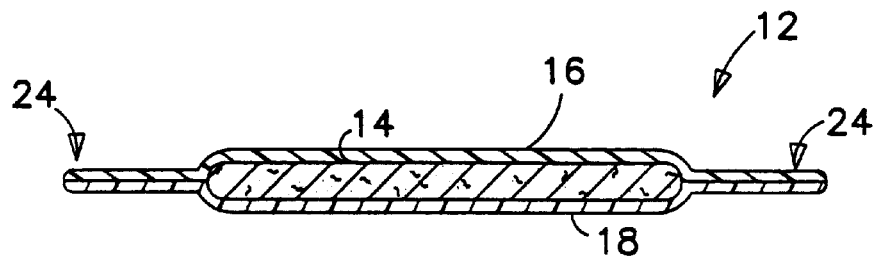
FIG. 2 shows a cross-section view, taken at 2—2 of FIG. 1, of a substrate web including an outer cover, a bodyside liner, and an absorbent core.

FIG. 1 shows a first embodiment of the invention. In this embodiment a substrate web 12 has absorbent cores 14 positioned therein. As shown in FIG. 2, substrate web 12 comprises a first outer cover 16 and a second bodyside liner 18. Absorbent cores 14 are positioned in locations spaced apart from each other a predetermined distance along the length of the substrate web as shown in FIG. 1. Absorbent cores 14 have a greater thickness than outer cover 16 or bodyside liner 18. Therefore, substrate web 12 has an increased thickness at absorbent cores 14.

As shown in FIG. 2, portions of the length of outer cover 16 and bodyside liner 18, in surface-to-surface relationship with each other and spaced outwardly from absorbent core 14, in some instances, can be bonded to one another, before substrate web 12 enters ultrasonic system 20 shown in FIG. 1. Such bonding can occur at a nip (not shown) upstream from ultrasonic system 20. At such a nip, outer cover 16 and bodyside liner 18 can be secured at outside portions along the length of substrate web. Such securement can be by application of adhesive or by ultrasonic bonding. Such a result is shown by absorbent article 22 in FIG. 3. Side seals 24 of absorbent article 22 can be formed upstream of ultrasonic system 20 by ultrasonic bonding. Thus the cross-sectional view of FIG. 2 shows side seals securing the outer cover 16 and bodyside liner 18 to contain absorbent cores 14 of substrate web 12.

In other preferred embodiments. Side seals 24 of absorbent article 22 preferably are formed downstream of ultrasonic system 20 by ultrasonic bonding.

Figure 3:
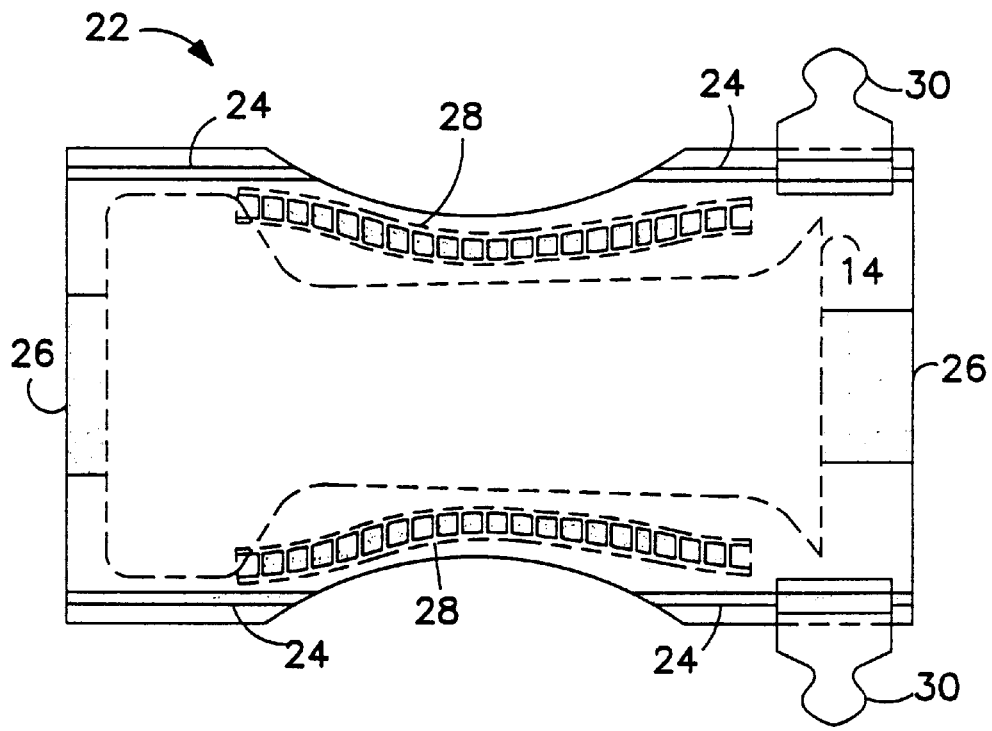
FIG. 3 shows a top view of an exemplary product, made from the substrate web of FIG. 2, by using the bonding system of FIG. 1.

Absorbent article 22 of FIG. 3 includes end seals 26 formed by ultrasonic system 20 of FIG. 1. Absorbent article 22 further includes leg elastics 28 and attachment ears 30. Absorbent article 22 could be configured as an infant diaper, an adult incontinence article, training pants, a feminine napkin, or other personal care articles.

Figure 4:
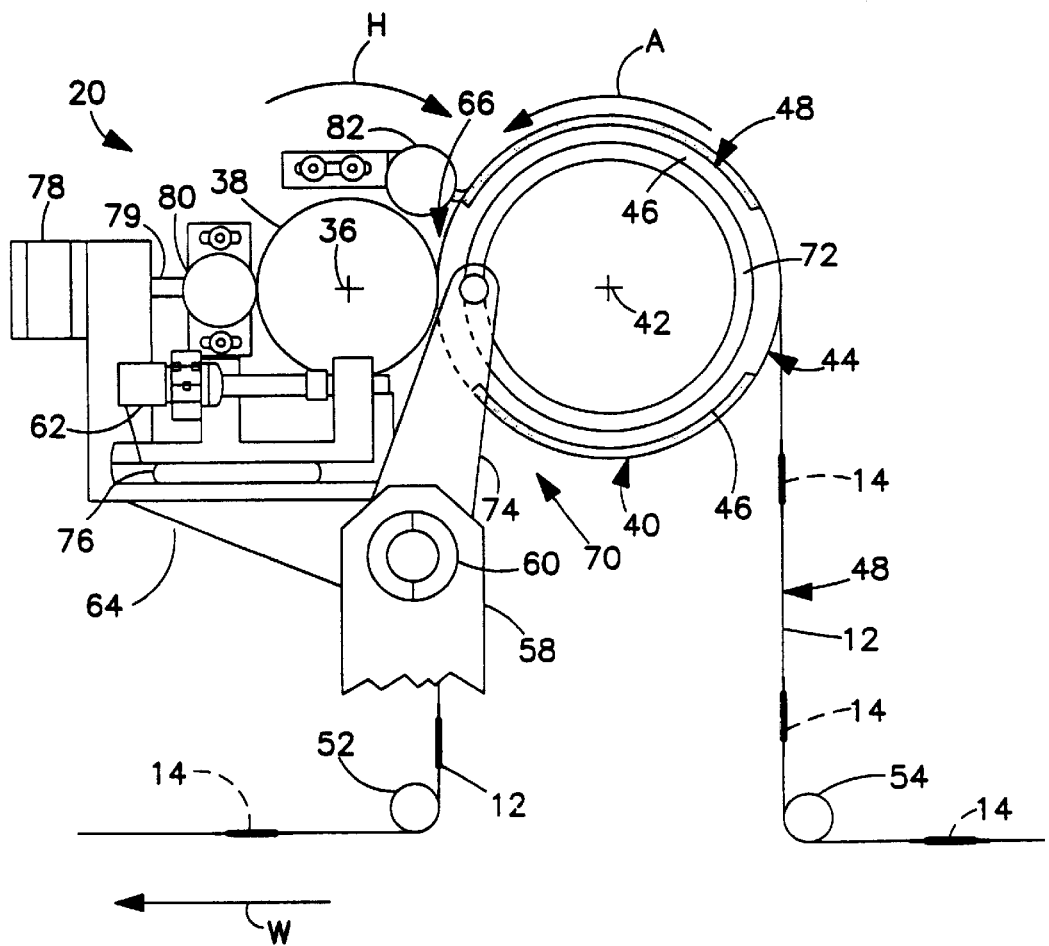
FIG. 4 shows a side view, taken from 4—4 of FIG. 1, but not including a complete view of all of the support elements 56, 58 of FIG. 1, to better illustrate the relationship of the anvil roll, ultrasonic horn, and cam mechanism of the ultrasonic bonding system.

Ultrasonic system 20 of FIG. 1 includes an ultrasonic unit 32 including a rotary ultrasonic horn 34 having a central axis 36 and an outer radial surface 38 (See FIG. 4). Ultrasonic unit 32 generates ultrasonic energy, preferably at 20,000 Hertz, and the energy is applied to substrate web 12 through ultrasonic horn 34. Ultrasonic system 20 also includes anvil roll 40 having a central axis 42 and an outer radial surface 44 (See FIG. 4). Central axis 42 of anvil roll 40 is substantially parallel to central axis 36 of rotary ultrasonic horn 34. Ultrasonic horn 34 generally has a substantially cylindrical shape.

As shown in FIG. 4, anvil roll 40 may include plural recessed inserts 46 corresponding to, and receiving absorbent cores 14 as substrate web 12 travels about the anvil roll. Thus top surface 48 of substrate web 12 maintains a substantially constant radius about central axis 42 of anvil roll 40 despite the presence of absorbent cores 14. Anvil roll 40 is preferably driven to promote common registration of outer cover 16 and bodyside liner 18 of substrate web 12 as shown in FIG. 2. Anvil roll 40 generally has a substantially cylindrical shape.

Ultrasonic system 20 of FIG. 1 includes a base 50, turning roll 52, turning roll 54 (shown in FIG. 4), anvil support element 56 including support shaft 57, pivot support element 58 including horn assembly pivot 60, horn micro adjustment apparatus 62, base support table 63, and floating support table 64. Turning roll 54 turns substrate web 12 toward anvil roll 40. After passing through nip 66, substrate web 12 is then transferred by turning roll 52 away from ultrasonic system 20 for further processing. Cam follower 74 pivots base support table 63 about pivot 60 when following cam track 72. Horn slide bearings 76 enable linear movement of floating support table 64 relative to base support table 63. Ultrasonic unit mounting arm 77 fixedly secures ultrasonic unit 32 to floating support table 64. Some other elements, not significant with respect to the invention, are not illustrated or otherwise described, because such elements are well known in the ultrasonic bonding art.

FIG. 4 shows a partial side view taken at 4—4 of FIG. 1 showing actuator apparatus 70 and other elements of the invention. Other elements, having standard purposes in ultrasonic systems, are omitted. Actuator apparatus 70 includes a cam track 72 extending about central axis 42 on one end of anvil roll 40. Actuator apparatus 70 also includes a cam mechanism comprising a cam follower 74 and a cam track 72. Cam follower 74 follows cam track 72 as the cam track rotates about central axis 42 of anvil roll 40. Cam follower 74 is fixedly secured to floating support table 64 in FIG. 4 so that floating support table 64 pivots about horn assembly pivot 60 when cam follower 74 moves due to variations in the radius of cam track 72. Thus, in the embodiment of FIGS. 1 and 4, anvil roll 40 is fixed relative to ultrasonic horn 34. Of course, ultrasonic horn 34 rotates in the direction shown by arrow H. Likewise, anvil roll 40 rotates in the direction shown by arrow A.

Anvil roll 40 is supported by anvil support element 56 (not shown in FIG. 4) on shaft 57, and by another support element (not shown) on the opposing end of the anvil roll. Anvil support elements and shaft 57 support anvil roll 40 from base 50. Shaft 57 generally is metal, such as steel, or other material having suitable structural properties. Anvil roll 40 can have thereon a raised pattern of pin elements, or any other suitable bond pattern, to bond outer cover 16 and bodyside liner 18 to each other.

FIG. 1 shows linear horn slide bearings 76. Horn slide bearings 76, in combination with fluid cylinder 78, act as a load governor mechanism to relieve force on ultrasonic horn 34 when the force is greater than about 900 Newtons (200 lbs.) while the ultrasonic horn is engaging anvil roll 40. The values for the mechanical force applied to the webs and the ultrasonic energy applied by ultrasonic horn 24 can vary below or beyond the value of 900 Newtons depending on the material being worked and the speed of the webs.

As shown in FIG. 1, floating support table 64 is supported by slide bearings 76 on base support table 63. A force transfer support 65 is secured to, or integral with, floating support table 64.

As shown in FIG. 4, a moveable force transfer element 79 transfers force due to fluid pressure in fluid cylinder 78 to force transfer support 65. The moveable force transfer element 79 is biased by the fluid pressure. However, where the cam mechanism pivots base support table 63, such that ultrasonic horn 34 does not contact anvil roll 40, moveable force transfer element 79 cannot move a sufficient distance to reposition ultrasonic horn 34 in contact with anvil 40.

When the cam mechanism pivots base support table 63, and ultrasonic horn 34 thereon, toward anvil roll 40, the fluid pressure is controlled, so that the force applied by force transfer element 79 is maintained at a substantially constant value of about 900 Newtons. The length of force transfer element 79 can decrease as needed, and ultrasonic horn 34 can move away from anvil roll 40 via linear horn slide bearings 76. In this manner, the force applied by ultrasonic horn 34 onto substrate web 12 and anvil roll 40 preferably cannot exceed about 900 Newtons or another predetermined amount of force. Fluid pressure can be varied to change the maximum force that ultrasonic horn 34 can apply onto substrate web 12 and anvil roll 40.

Horn micro adjustment apparatus 62 fine tunes and controls the position of ultrasonic horn 34 with respect to anvil roll 40. Micro adjustment apparatus 62 can increase or decrease the length of end seals 26 created by ultrasonic system 20 as substrate web 12 moves through nip 66 in the machine direction, as shown by arrow "W" in FIG. 1. Such a result occurs because micro adjustment apparatus 62 limits the set-up spacing of ultrasonic horn 34 and anvil roll 40.

Fluid cylinder 78 applies and controls the force to ultrasonic horn 34 of ultrasonic unit 32 such that proper bonding occurs. Fluid cylinder 78 can be a pneumatic type pressure cylinder. The fluid utilized to apply force from fluid cylinder 78 through force transfer element 79 can comprise air, various liquids, or the like.

Back up wheels 80, 82 assist in keeping ultrasonic horn 34 centered on anvil roll 40. Back up wheels 80, 82 function in a similar manner to other back up wheels known in the ultrasonic horn art. To aid in the illustration of other elements, back up wheels 80. 82 are not shown in FIG. 1.

PRODUCT MATERIALS

Absorbent core 14 suitably comprises a relatively thicker structure, compared to outer cover 16 and bodyside liner 18, and includes a matrix of hydrophilic fibers. such as a web of cellulosic fluff, preferably in combination with a high-absorbency material commonly known as superabsorbent material. In a particular embodiment. absorbent core 14 comprises a mixture of superabsorbent hydrogel-forming particles and wood pulp fluff. In place of the wood pulp fluff, one may use synthetic, polymeric, meltblown fibers or a combination of meltblown fibers and natural fibers. The superabsorbent material may be substantially homogeneously mixed with the hydrophilic fibers or may be otherwise combined into absorbent core 14.

Alternatively, absorbent core 14 may comprise a laminate of fibrous webs and superabsorbent material or other suitable means of maintaining a superabsorbent material in a localized area.

Absorbent core 14 can have any of a number of shapes. For example, the absorbent core may be rectangular, oval-shaped, the hourglass shape shown in FIG. 3, or other useful shapes.

The superabsorbent material in absorbent core 14 can be selected from among natural, synthetic and modified natural polymers and materials. The high absorbency materials can be inorganic materials, such as silica gels, or organic compounds, such as crosslinked polymers. The term crosslinked refers to any means for effectively rendering normally water-soluble materials substantially water insoluble but swellable, whereby absorbent properties are available but the swelled material is substantially immobile after absorbing water-based liquids. Such means can include, for example, physical entanglement, crystalline domains. covalent bonds, ionic complexes and associations, hydrophilic associations such as hydrogen bonding, and hydrophobic associations or Van der Waals forces.

Outer cover 16 can be formed from a single layer, or from multiple components, layers, or partial layers, of material, such that the resulting outer cover is substantially impermeable to liquids. A typical outer cover 16 may be manufactured from a thin plastic film or other flexible liquid-impermeable material. For example, outer cover 16 can be formed from a polyethylene film having a thickness of from about 0.012 millimeters to about 0.051 millimeters. When it is desirable that outer cover 16 have a more clothlike feeling, it may comprise, for example, a polyethylene film laminated to a surface of a nonwoven web, such as a spunbonded web of polyolefin fibers. For example, a polyethylene film having a thickness of about 0.015 millimeters may have thermally or otherwise laminated thereto a spunbonded web of polyolefin fibers having a thickness of from 1.5 to 2.5 denier per filament, which nonwoven web has a basis weight of about 24 grams per square meter. Further, outer cover 16 can be formed of a woven or nonwoven fibrous web which has been totally or partially constructed or treated to impart a desired level of liquid impermeability to selected regions that are adjacent or proximate absorbent core 34. Still further, outer cover 16 may optionally be composed of a micro-porous material which permits vapors to escape from absorbent core 34 and through the outer cover while preventing liquid exudates from passing through the outer cover.

A suitable bodyside liner 18 may be manufactured from a wide selection of web materials, such as porous foams, reticulated foams, apertured plastic films or natural or synthetic fibers. For example, bodyside liner 18 may comprise wood or cotton fibers. Other possible materials are synthetic fibers, such as polyester or polypropylene fibers, or a combination of natural and synthetic fibers. Bodyside liner 18 is suitably utilized to help isolate liquids held in absorbent core 14 from the skin of the wearer.

In addition, various woven and nonwoven fabrics can be used for bodyside liner 18. For example, bodyside liner 18 may be composed of a meltblown or spunbonded web of polyolefin fibers. Bodyside liner 18 may also comprise a carded and/or bonded web composed of natural and/or synthetic fibers. Bodyside liner 18 preferably comprises a substantially hydrophobic material wherein the hydrophobic material is treated with a surfactant or otherwise processed to impart a desired level of wettability and hydrophilicity.

In a particular embodiment of the present invention, bodyside liner 18 may comprise a spunbonded polypropylene fabric composed of about 2.8–3.2 denier fibers formed into a web having a basis weight of about 22 grams per square meter and a density of about 0.06 grams per cubic centimeter. Most portions of the fabric can be treated with about 0.3 weight percent of a surfactant. Bodyside liner 18 may comprise a multiplicity of components, layers, or partial layers, which correspond to any of the materials disclosed herein, as well as others known in the art. Bodyside liner 18 can include skin conditioners, such as aloe.

In other embodiments, ultrasonic system 20 may be used to join two or more layers of material to each other without absorbent cores therebetween.

Ultrasonic energy units 32 can comprise, for example, devices set forth in U.S. Pat. No. 5,096,532 issued Mar. 17, 1992 to Neuwirth et al or U.S. Pat. No. 5,110,403 to Ehlert issued May 5, 1992, both of which are hereby incorporated by reference in their entireties. The width of each respective rotary ultrasonic horn 34 generally is about 80 millimeters or less. Greater widths are useful therein to the extent suitable rotary ultrasonic horns are available. In one embodiment, ultrasonic horn 34 can apply about 800 Watts of energy.

The mechanical force applied to substrate web 12, the speed of the web, the power supplied by ultrasonic horn 34, and the material of the web being worked have an effect on the final product that is made. For example, increasing the speed of travel of the webs requires increased mechanical force and/or increased ultrasonic energy to perform bonding in the shorter time period the webs are being worked by ultrasonic horn 34. Therefore, the values for the mechanical force applied to the webs and the ultrasonic energy applied by ultrasonic horn 24 can vary below or beyond the value of 900 Newtons.

Anvil roll 40 typically includes a pattern of raised lands (not shown) thereon, corresponding to the ultrasonic bond pattern of ultrasonic system 20. In other embodiments, though less preferred, the pattern of lands can be present on ultrasonic horn 34. The pattern of lands can comprise a pattern of pin elements or a pattern of lines. Such lines may be, for example, continuous or discontinuous, crossing or non-crossing, straight or not straight.

Drive apparatus (not shown) drives shaft 57 and rotates anvil roll 40 about the shaft in the direction of arrow A (FIG. 4) at a speed generally corresponding to the speed at which substrate webs 12 advances through the ultrasonic system 20. Rotary ultrasonic horn 34 rotates cooperatively against the outer surface of anvil roll 40, as shown by arrow H in FIG. 2.

Base 50 provides a mounting base for support elements 56, 58 and other elements (not shown). Base 50 generally comprises a metal, such as steel. In other embodiments, base 50 can be replaced by earth, such as the cement floor of a factory, or other suitable support. Thus, base 50 need not be present per se in all embodiments.

Turning rolls 52, 54 may be driven, or may be idler rolls such that there is no direct drive of the rolls. Preferably, turning rolls 52, 54 move substantially at the same speed as substrate web 12.

OPERATION

Anvil roll 40 rotates at a surface speed corresponding with the speed of advance of substrate web 12, namely the speed at which the web is drawn by nip 66. Substrate web 12 must be registered with respect to outer radial surface 44 of anvil roll 40 so that portions, along the length of substrate web 12, containing consecutive absorbent cores 14 are registered in consecutive recessed inserts 46 of the anvil roll. Registration enables substrate web 12 passing through nip 66 to have substantially the same thickness along the length of the web.

Anvil roll 40 rotates and carries substrate web toward nip 66 for controlled intermittent bonding using ultrasonic horn 34. Actuator apparatus 70 including cam track 72 formed as part of anvil roll 40, cam follower 74, and ultrasonic horn assembly pivot 60 periodically pivot table support 64 and thus ultrasonic horn 34 away from the anvil roll to move the horn from engaging contact with the anvil roll. Such movement away prevents bonding of substrate web 12.

"Engaging contact" of ultrasonic horn 34 and anvil roll 40 occurs when the force in nip 66 is effective to place layers, such as outer cover 16 and bodyside liner 18 traversing in surface-to-surface relationship, in physical contact when passing through the nip. Therefore "engaging contact" does not require actual physical contact of ultrasonic horn 34 and anvil roll 40, because of the presence of substrate web 12, formed by outer cover 16 and bodyside liner 18, therebetween. "Engaging contact" does apply a compressive force to substrate web 12 in nip 66. Fluid cylinder 78 can control such an amount of force.

In the embodiment of FIGS. 1–4, actuator apparatus 70 operates to cause intermittent bonding of substrate web 12 forming end seals 26 for use in absorbent article 22 shown in FIG. 3. As shown in FIG. 1, end seals 26 are positioned at a central portion of substrate web 12 across the width of the web. Forming intermittent bonds at end seals 26 requires registration between ultrasonic horn 34 and anvil roll 40. Since cam track 72 is an extension of anvil roll 40, registration between the pivoted position of ultrasonic horn 34, and thus control of engaging contact between the horn and anvil roll, can be controlled easily. Proper registration occurs because cam track 72 moves cam follower 74 at selected times during the rotation of anvil roll 40. The selected times correspond to the position of inserts 46 such that engaging contact and intermittent bonding occur at nip 66 when the inserts are spaced therefrom. Thus end seals 26 absorbent articles 22 can be formed for the absorbent articles 22. Of course, after creation of end seals 26 using ultrasonic energy, substrate web 12 is subsequently cut across the width of end seals 26 to form individual absorbent articles 22.

In operation, actuator apparatus 70 causes ultrasonic horn 34 to periodically contact anvil roll 40, thereby bonding substrate web 12 passing the first outer radial surface of the ultrasonic horn. Thus actuator apparatus 70 periodically displaces first outer radial surface 38 of ultrasonic horn 34 from engaging contact with anvil roll 40, thus creating a physical gap between the ultrasonic horn and the substrate web on the anvil roll. Actuator apparatus 70 subsequently returns ultrasonic horn 34 to anvil roll 40, and re-establishes the engaging contact with the anvil roll in a timed or registered matter.

The physical gap created by separation of ultrasonic horn 34 and anvil roll 40 preferably comprises no more than about 2 millimeters, more preferably no more than about 1 millimeter, and most preferably no more than about 0.7 millimeter. The physical gap preferably comprises no less than about 0.2 millimeter. The physical separation most preferably being from about 0.3 millimeter to about 0.7 millimeter. The gap size can also vary dependent on the type of material being fed through nip 66 between ultrasonic horn 34 and anvil roll 40. Such a gap size enables separation and closing of the gap at an appropriate speed such that bonds can be created between layers in nip 66 at an appropriate rate. One preferred bonding rate is at least 600 times per minute. Substrate web 12 preferably travels at a rate of at least about 200 meters per minute, more preferably at least about 300 meters per minute. The relatively high speed of travel for substrate web 12, and the large number of separations and engaging contacts per minute between ultrasonic horn 34 and anvil roll 40, enable ultrasonic system 20 of the invention to work more product per minute than conventional ultrasonic systems. The increased speed of substrate web 12 enables a production line to produce many more absorbent articles 22 for a given period of time. Therefore, the invention provides a tremendous improvement and benefit in cost because of the increased speed in making absorbent articles. Another benefit is more consistent bonding at high speeds of material through nip 66 which leads to production of a better, improved absorbent articles 22.

The amount of physical separation in the gap created, as disclosed above, is also extremely important. If the gap is too large, the closing velocity when closing the physical gap and positioning first outer radial surface 38 of ultrasonic horn 34 in engaging contact with second outer radial surface 44 of anvil roll 40 can cause bounce or impact loading of the horn on the anvil roll. Therefore, in part because of the small size of the physical gap, the relative surfaces of ultrasonic horn 34 and anvil roll 40 preferably move toward each other at an approach velocity or closing velocity of no more than about 80 millimeters/second, and most preferably move toward each other at an approach velocity of no more than about 30 millimeters/second. Such a speed minimizes the impact when outer radial surface 38 of ultrasonic horn 34 contacts substrate web 12 on outer radial surface 44 of anvil roll 40. The low closing speed just before contact and relatively small amount of separation avoid harmful impact loading of outer radial surface 38 of ultrasonic horn 34 or outer radial surface 44 of anvil roll 40. The low approach velocity avoids deleterious bounce between ultrasonic horn 34 and anvil roll 40, thereby enhancing the useful life of the horn and anvil roll.

In the embodiment of FIGS. 1–4, cam track 72 determines the amount of periodic separation between ultrasonic horn 34 and anvil roll 40. Cam track 72 comprises a cam that is elliptically shaped. The elliptical shape ensures that ultrasonic horn 34 moves slightly toward and away from anvil roll 40 twice during each rotation of the cam. The elliptical shape is graduated to prevent quick or fast changes in the relative positions of ultrasonic horn 34 and anvil roll 40. During rotation, the cam mechanism, including the cam track, preferably moves outer radial surface 38 of ultrasonic horn 34 no more than about 2 millimeters away from outer radial surface 44 of anvil roll 40. Such a gradual and small amount of camming on cam track 72 is almost imperceptible to the human eye, generally on the order of 0.2 millimeter to 2 millimeters.

SECOND EMBODIMENT OF THE INVENTION

Figure 5:
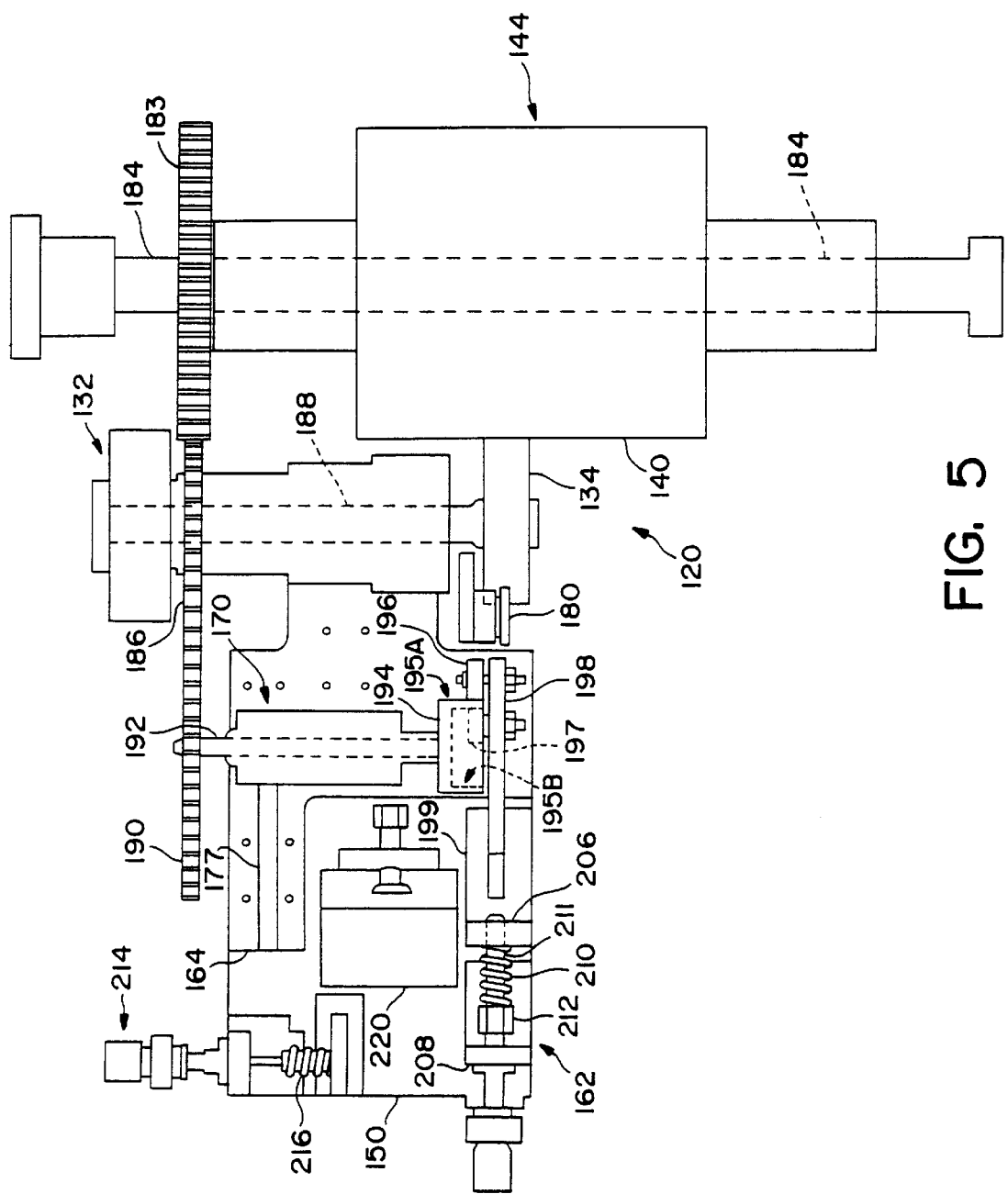
FIG. 5 shows a top view of a second embodiment of an ultrasonic bonding system of the invention.

FIG. 5 illustrates another family of embodiments of ultrasonic system 120 of the invention wherein the prefix "1" indicates the instant embodiment, a second embodiment of the invention. Second and third digits are used in common, where possible, with the earlier embodiment. In the second embodiment, rotary anvil roll 140 includes an anvil roll gear 183 extending from a shaft 184. Anvil roll gear 183 rotates ultrasonic horn 134 of ultrasonic unit 132 via an ultrasonic unit gear 186. Shaft 184 of anvil roll 140 is substantially parallel to shaft 188 of ultrasonic unit 132. The teeth of anvil roll gear 183 are positioned to align with the teeth of ultrasonic unit gear 186. Anvil roll shaft 184 preferably is driven and thus rotates anvil roll 140 and ultrasonic horn 134 via ultrasonic unit gear 186. Ultrasonic unit 132 includes ultrasonic horn 134 placed substantially in physical contact with anvil roll 140. An actuator apparatus 170 includes a cam gear 190 in alignment with ultrasonic unit gear 186. Cam gear 190 is secured to a first end of cam shaft 192 of actuator apparatus 170. A cam 194 is secured to the second opposing end of cam shaft 192.

Figure 6:
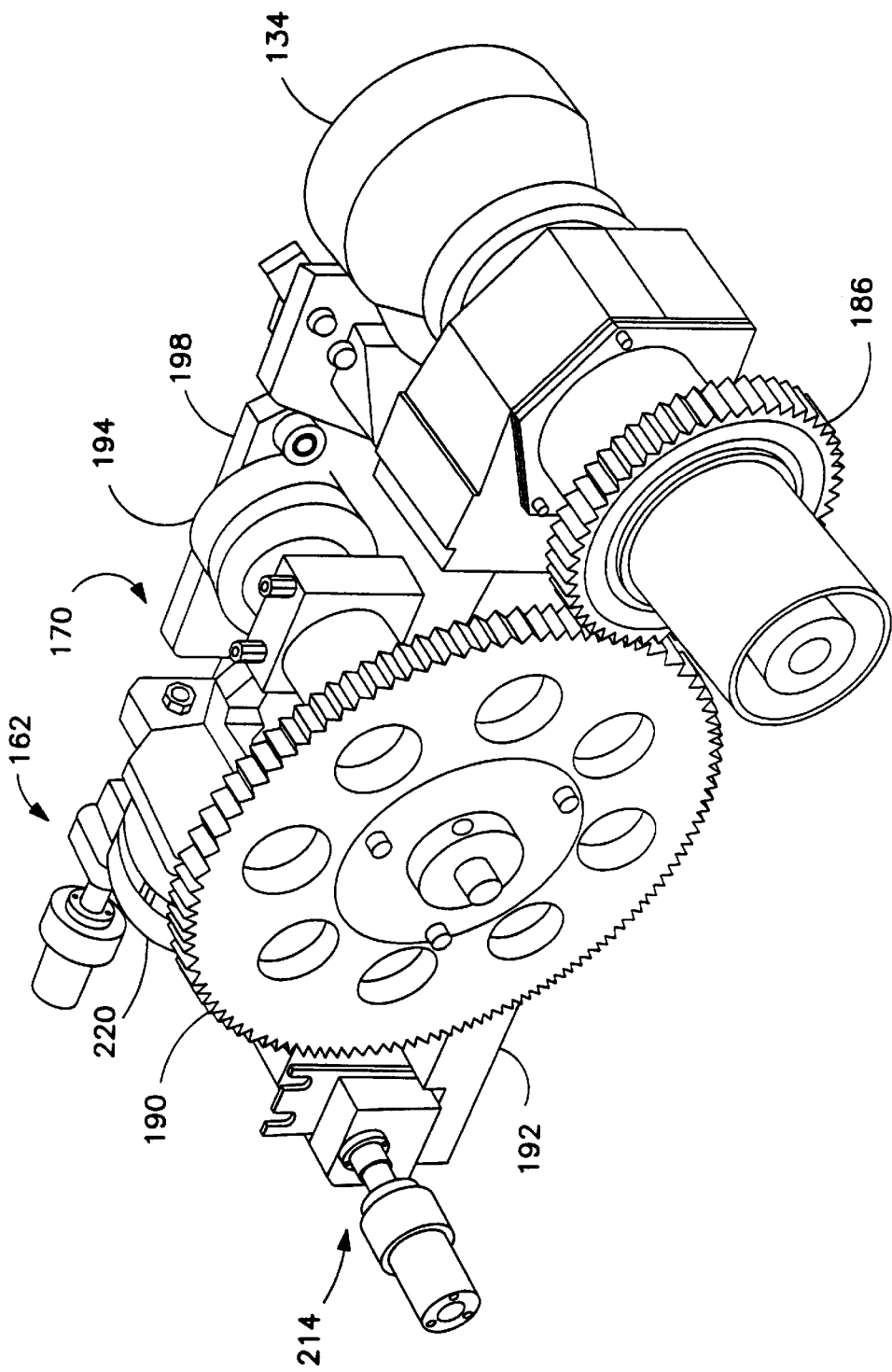
FIG. 6 shows a first pictorial view of the ultrasonic bonding system of FIG. 5, except for removal of the anvil roll.
Figure 7:
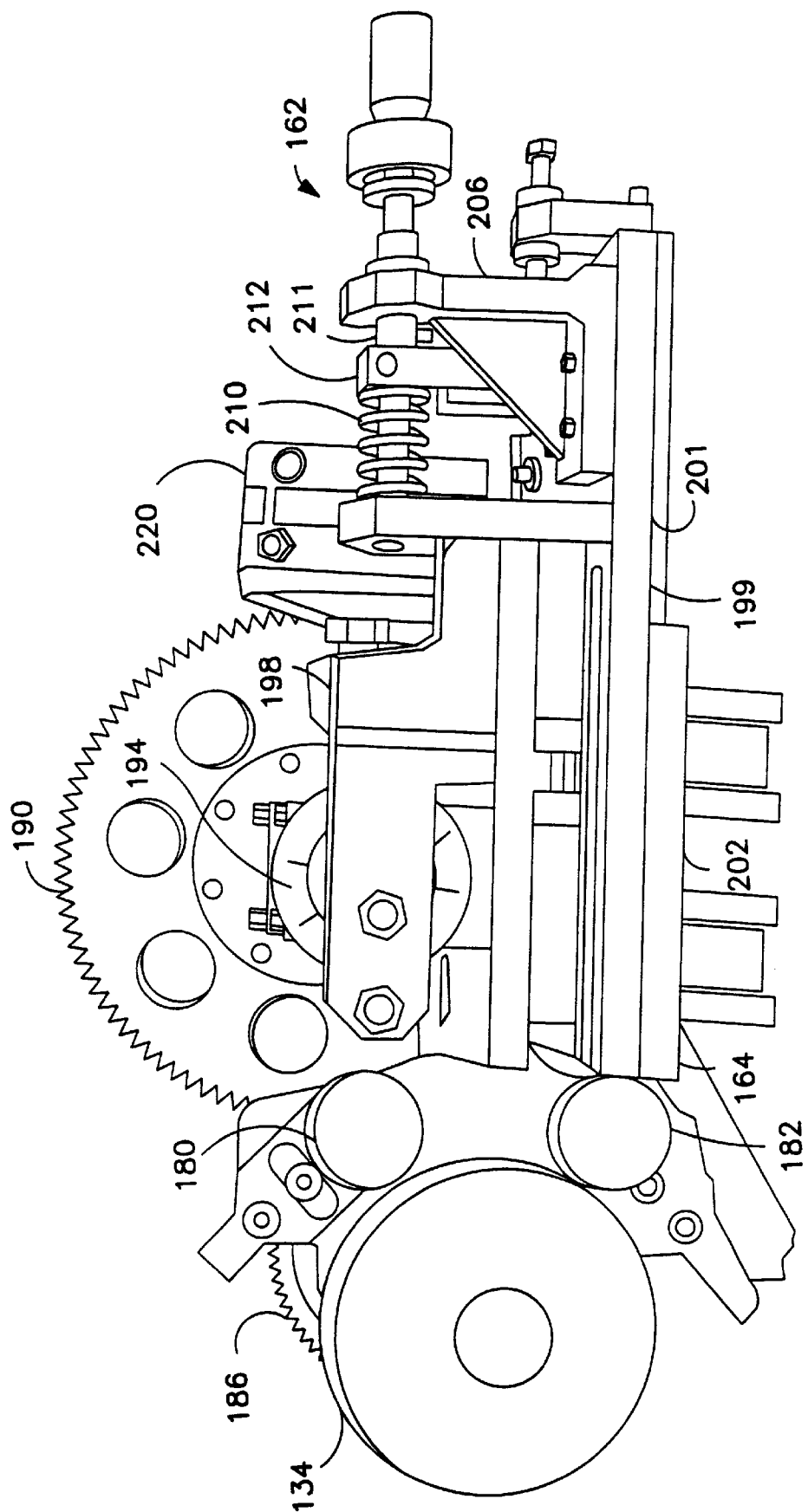
FIG. 7 shows another pictorial view of the ultrasonic bonding system of FIG. 6 from a different angle.

Cam 194 has a similar cylindrical elliptical shape to cam track 72 described earlier. However, cam track 72 acts with cam follower 74 to control pivoting of the cam follower. In FIG. 6, cam 194 rotates about cam shaft 192. An outer radial surface 195A of cam 194 is in physical contact with cam roll 196. As shown in FIG. 5, an inner radial surface 195B of cam 194 is in physical contact with cam roll 197. As shown in FIGS. 5–7, cam rolls 196, 197 are bolted or otherwise fixedly secured to support arm 198. Support arm 198 is secured to or integral with support arm plate 199. Support arm plate 199 includes at least one linear bearing 201 enabling movement of the support arm plate toward or away from ultrasonic horn 134.

As shown in FIG. 5, moveable plate 164 supports ultrasonic unit 132 and actuator apparatus 170. Moveable plate 164 is supported by linear bearings 202, or other elements, with respect to base 150. Actuator apparatus support arm 177 secures actuator apparatus 170 to moveable plate 164. Likewise, ultrasonic unit 132 is fixedly secured to moveable plate. Base 150 and anvil roll 140 are fixed and thus do not move significantly. Moveable plate 164 and linear bearings 202 enable ultrasonic horn 134 and actuator apparatus 170 to substantially move together, in a pair of opposing essentially linear directions, toward and away from anvil roll 140, respectively.

In operation, the elliptical shape of cam 194 changes the relative distance between the cam and cam rolls 196, 197 such that moveable plate 164 periodically moves ultrasonic horn 134 away from anvil roll 140 when the largest width of cam 194 is in surface-to-surface contact with cam roll 196. Such movement is enabled by the spacing of the teeth of anvil roll gear 183 and ultrasonic unit gear 186, such that the gears can move slightly toward each other without causing ends of the gear teeth to contact openings of the other respective gear teeth at forces that prevent relative movement or damage the gears.

Further, when the narrowest width of cam 194 is in surface-to-surface contact with cam roll 196, the lengths of the teeth of anvil roll gear 183 and ultrasonic unit gear 186 are such that relative inward or outward movement of the teeth of the anvil roll gear and the ultrasonic unit gear, with respect to each other, does not cause the respective gear teeth to loose contact with each other, e.g. the respective gear teeth continue to mesh properly.

In the embodiment of FIG. 5, cam 194 includes an open interior, inner radial surface 195B substantially corresponding to the elliptical shape of outer radial surface 195A of the cam. As shown in FIG. 5, cam roll 197 contacts inner radial surface 195B of cam 194. In operation, cam rolls 196, 197 move in combination, in response to rotation of cam 194 during rotation of cam shaft 192. Through moveable plate 164, changes in the elliptical shape of cam 194 move ultrasonic horn toward and away from anvil roll 140. Such movement of ultrasonic horn 134 toward and away from anvil roll 140 operates in a similar manner to the embodiment of FIG. 1.

Horn micro adjustment apparatus 162 acts as a load governor mechanism to relieve force on ultrasonic horn 134 when the force is greater than a preselected amount of force. As better shown in FIG. 7, a front support element 206 of horn micro adjustment apparatus 162 is fixedly secured to support arm plate 199. A rear support element 208 of horn micro adjustment 162 is fixedly secured to base 150. A load spring 210 is positioned between front support element 206 and rear support element 208. In operation, horn micro adjustment 162 enhances the ability of actuator apparatus 170 to move ultrasonic horn 134 relative to anvil roll 140 because support elements 206, 208 are fixed to support arm plate 199 and fixed base 150, respectively. Load spring 210 is supported by a shaft 211 extending between and through support elements 206, 208. An adjustment element 212 enables adjustment of the force applied by horn micro adjustment apparatus 162 against ultrasonic horn 134.

When a force greater than the preselected maximum force is applied to ultrasonic horn 134, cam rolls 196, 197, transfer the force through support arm 198 to support arm plate 199. Support arm plate 199 transfers the force to load spring 210. In actual use, load spring 210 can flex and compact in response to increased force. Thus the load spring absorbs some of the increased load force. In use, linear bearing 201 enables linear movement of support arm plate 199 due to increased force. Such movement thus transfers force for dissipation in load spring 210.

In the above manner, horn micro adjustment apparatus 162 can absorb force. For instance, when the force is great enough to damage the equipment described herein or when an increased force can damage ultrasonic horn 134 or anvil roll 140, apparatus 162 can absorb force.

Back up wheels 180, 182 assist in keeping ultrasonic horn 134 centered on anvil roll 140. Back up wheels 180, 182 function in a similar manner to other back up wheels known in the ultrasonic horn art.

Parallel adjustment apparatus 214, shown in FIG. 5, enables adjustment of moveable plate 164 and ultrasonic horn 134 thereon in a direction to ensure anvil roll shaft 184 and cam shaft 192 are substantially parallel to each other. Such adjustment ensures that the outer radial surface 138 of ultrasonic horn 134 and the outer radial surface 144 of anvil roll 140 are in perfect alignment thereacross, to ensure proper bonding across the width of the ultrasonic horn. Parallel load spring 216 of parallel adjustment apparatus 214 controls the amount of angular movement of ultrasonic horn 134 with respect to anvil roll 140. Such parallel adjustment apparatus 214 are well known for use in rotary ultrasonic systems.

Stop apparatus 220, shown in FIGS. 4–7, protects ultrasonic horn 134 from damage by preventing sudden extreme movements of the horn. Such apparatus 220 are generally known in the ultrasonic art to protect ultrasonic systems from damage.

THIRD EMBODIMENT OF THE INVENTION

Figure 8:
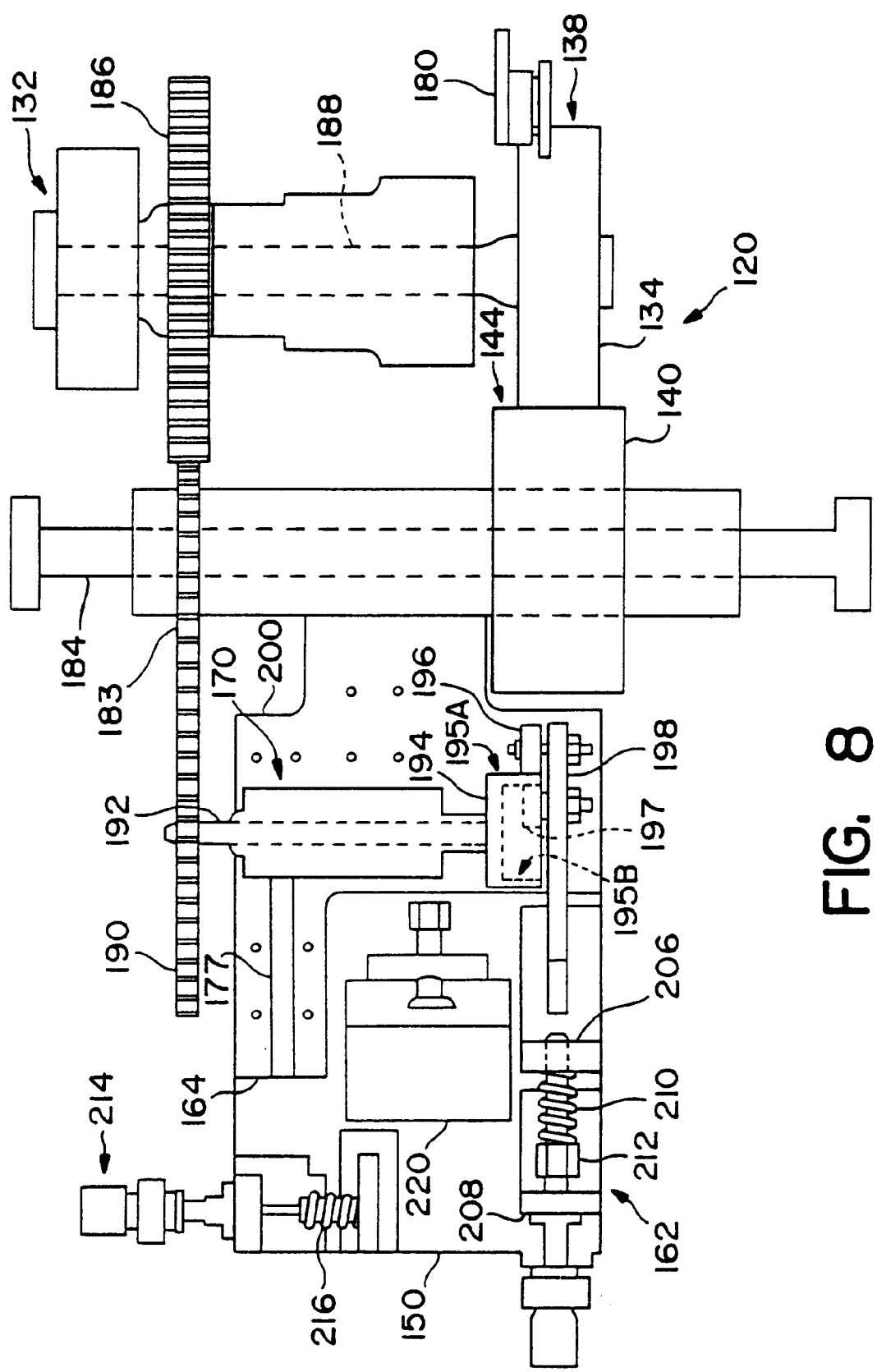
FIG. 8 shows a top view of a third embodiment of an ultrasonic bonding system of the invention.

The embodiment of FIG. 8 is similar to the embodiment of FIGS. 5–7. However, in this embodiment, the positions of ultrasonic unit 132 and anvil roll 140 are reversed. However, many of the elements perform substantially the same functions. However, anvil roll 140 is displaced toward and away from ultrasonic horn 134 in this embodiment.

As shown in FIG. 8, moveable plate 164 extends about much of anvil roll 140. Moveable plate 164 supports anvil roll 140 and actuator apparatus 170. Moveable plate 164 is supported by linear bearings 202, or other elements, with respect to base 150. Base 150 and ultrasonic unit 132 are fixed and thus do not move significantly. Moveable plate 164 and linear bearings 202 enable anvil roll 140 and actuator apparatus 170 to move together, in a pair of opposing essentially linear directions, toward and away from anvil roll 140, respectively.

In a similar manner to the embodiment of FIGS. 5–7, the elliptical shape of cam 194 changes the relative distance between the cam and cam rolls 196, 197 such that moveable plate 164 periodically moves anvil roll 140 away from ultrasonic horn 134 when the largest width of cam 194 is in surface-to-surface contact with cam roll 196.

In the embodiment of FIG. 8, cam 194 includes an open interior, inner radial surface 195B substantially corresponding to the elliptical shape of outer radial surface 195A of the cam. As shown in FIG. 8, cam roll 197 contacts inner radial surface 195B of cam 194. In operation, cam rolls 196, 197 move in combination, in response to rotation of cam 194 during rotation of cam shaft 192. Through moveable plate 164 and linear bearings 202, changes in the elliptical shape of cam 194, move anvil roll 140 toward and away from ultrasonic horn 134. Such movement of anvil roll 140 toward and away from ultrasonic horn 134 operates n a reverse manner to the embodiment of FIGS. 5–7 to protect the ultrasonic horn and anvil roll.

Horn micro adjustment apparatus 162 acts as a load governor mechanism to relieve force on anvil roll 140, preferably when the actual force is greater than a predetermined value. Horn micro adjustment apparatus 162 thus operates in a similar manner to the apparatus set forth in the embodiment of FIGS. 5–7, except, in operation, horn micro adjustment 162 enhances the ability of actuator apparatus 170 to move anvil roll 140 relative to ultrasonic horn 134.

In the above manner, horn micro adjustment apparatus 162 can absorb force when the force is great enough to damage the equipment described herein or when an increased force can damage ultrasonic horn 134 or anvil roll 140.

Back up wheels 180, 182 assist in keeping ultrasonic horn 134 centered on anvil roll 140. Back up wheels 180, 182 function in a similar manner to other back up wheels known in the ultrasonic horn art.

Parallel adjustment apparatus 214, shown in FIG. 8, enables adjustment of moveable plate 164 and ultrasonic unit 132 to ensure anvil roll shaft 184 and cam shaft 192 are substantially parallel to each other. Such adjustment ensures that the outer radial surface 138 of ultrasonic horn 134 and the outer radial surface 144 of anvil roll 140 are in perfect alignment thereacross, to ensure proper bonding across the width of the ultrasonic horn. Parallel load spring 216 of parallel adjustment apparatus 214 controls the degree of parallel alignment between anvil roll 140 and ultrasonic horn.

OTHER VARIATIONS

Any one of the shafts of anvil roll 40, 140, ultrasonic horn 34, 134, or shaft 192 of the cam mechanism of FIG. 5 can comprise the drive shaft for the entire device. However, having a driven anvil roll shaft 184 is the preferred arrangement of the embodiment of FIGS. 5–7.

Any of the shafts mentioned above can comprise multiple elements, such as two or more shaft elements secured to each other to extend the shaft along a length thereof.

In other embodiments, cam 194 can have a variable change in radius like a modified sine wave pattern to reduce velocity at contact to close to zero millimeters per second. Thus the cam profile can vary the velocity of the ultrasonic horn/anvil roll as it approaches the other of the anvil roll/horn. Further, such a cam arrangement can form a pattern can have multiple bonding contacts between the ultrasonic horn and the anvil roll during a single rotation of the cam.

In other embodiments, actuator apparatus 170 can comprise a pressure actuator. While a cam mechanism is preferred, because of the tolerances involved and other factors, a pressure actuator device or other apparatus can simply move ultrasonic horn 34 toward and away from anvil horn 40 in a linear direction.

In some embodiments, additional ultrasonic units (not shown) may be disposed and arranged about anvil roll 40, as necessary, to ultrasonically bond outer cover 16 and bodyside liner 18 across at least portions of the width of the elements.

In the embodiments of FIGS. 5–8, an additional gear drive and gear (not shown) can be utilized to drive anvil roll gear 183, ultrasonic unit gear 186, and cam gear 190. Such an additional drive gear can be positioned to contact any one of the above listed gear elements.

Any number of webs can be secured to each other by ultrasonic system 20. For example, FIGS. 2 and 3 show outer cover 16 and bodyside liner 18 disposed in surface-to-surface relationship with each other and bonded together by ultrasonic energy. At least three or more webs can be disposed in contact with each other before reaching anvil roll 40 and being bonded together by ultrasonic horn 34.

Variations described with respect to any one embodiment of the invention can be utilized by any other embodiment of the invention.

Methods and apparatus described herein can be used to create bonds on a substrate web. The apparatus can be as illustrated in FIGS. 1 and 5–8. A typical method includes positioning absorbent cores 14 at spaced locations along the length of substrate web 12. Placement can be done by conventional pad placement machinery (not shown) such that the cores are spaced apart a predetermined distance along the length of substrate web 12, as shown in FIG. 1. Substrate web 12 then rotates about the outer radial surface 44 of anvil roll 40 at approximately the outer radial speed of the anvil roll. Ultrasonic energy from ultrasonic horn 34 of ultrasonic unit 32 bonds multiple layers of substrate web 12 to each other. For example, as described earlier, substrate web 12 can comprise at least outer cover 16 and bodyside liner 18. The method includes intermittently creating a gap between ultrasonic horn 34 and substrate web 12 on anvil roll 40. Such a gap ensures intermittent bonding of the layers of substrate web 12. Such bonding preferably occurs at end seals 26, spaced between absorbent cores 14, as shown in FIGS. 1. Substrate web 12, in FIG. 1, thus comprises an absorbent article subassembly.

The method of creating bonds can include the further step of severing substrate web 12 across end seals 26 by using known apparatus (not shown) to form individual absorbent articles as shown in FIG. 3.

Of course, the above described method, in other embodiments, can be utilized to simply intermittently secure separate layers of a substrate web to each other at nip 66 between ultrasonic horn 34 and anvil roll 40.

Those skilled in the art will now see that certain modifications can be made to the invention herein disclosed with respect to the illustrated embodiments, without departing from the spirit of the instant invention. And while the invention has been described above with respect to the preferred embodiments, it will be understood that the invention is adapted to numerous rearrangements, modifications, and alterations, all such arrangements, modifications, and alterations are intended to be within the scope of the appended claims.

having thus described the invention, what is claimed is:

1. A method of creating bonds on a substrate web, the substrate web having a length, the method comprising the steps of:
   (a) positioning absorbent cores between and along the length of a generally endless substrate web comprising a first outer cover layer and a second bodyside liner layer, the absorbent cores being spaced apart a predetermined distance along the length of the web;
   (b) receiving the substrate web at an anvil roll, and transferring the substrate web about the circumference of the anvil roll;
   (c) outputting ultrasonic energy from an ultrasonic horn, the ultrasonic horn and anvil roll forming a nip therebetween, the substrate web being between the ultrasonic horn and the anvil roll, the ultrasonic horn being in engaging contact with the anvil roll, and thus bonding the bodyside liner layer and the outer cover layer to each other; and
   (d) intermittently creating a physical gap between the ultrasonic horn and the substrate web on the anvil roll, such that regions of the substrate web containing respective ones of the absorbent cores are not bonded by ultrasonic energy.

2. A method as in claim 1, the anvil roll rotating about a central axis of rotation and having recessed areas corresponding to, and receiving spaced absorbent cores located along the length of the substrate web, such that the top surface of the substrate web maintains a substantially constant radius about the central axis of the anvil roll.

3. A method as in claim 2, the absorbent cores comprising discrete elements.

4. A method as in claim 1, including the step of feeding the substrate web through the nip at a velocity of at least 300 meters per minute.

5. A method as in claim 1, the step of intermittently creating a physical gap between the ultrasonic horn and the anvil roll including an actuator apparatus moving the ultrasonic horn toward the anvil roll at a velocity of no more than about 80 millimeters/second.

6. A method as in claim 1, the step of intermittently creating a physical gap in the nip comprising creating a maximum physical gap of no more than about 2 millimeters.

7. A method as in claim 1, the bonding of the layers of the substrate web being at positions corresponding to end seals on either side of the absorbent cores along the length of the substrate web.

8. A process for securing layers of a substrate web comprising:
   (a) outputting ultrasonic energy from a rotary ultrasonic horn having a first outer radial surface extending about at least a substantial portion of a circumference thereof;
   (b) receiving the substrate web to be worked by ultrasonic energy at a substrate web receiving surface of an anvil roll the substrate web receiving surface cooperating with the ultrasonic horn to form a close relationship comprising a nip between the ultrasonic horn and the anvil roll for passage of the substrate web therethrough; and
   (c) positioning the first outer radial surface of the ultrasonic horn in engaging contact with the substrate web receiving surface of the anvil roll, thereby to bond the layers of the substrate web passing through the nip; and
   (d) periodically displacing the first outer radial surface of the ultrasonic horn from the engaging contact with the anvil roll, thus creating a physical gap between the ultrasonic horn and the substrate web on the anvil roll, and subsequently returning the ultrasonic horn to the anvil roll, and thereby re-establishing the engaging contact with the anvil roll.

9. A process as in claim 8, the layers of the substrate web comprising a first outer cover layer and a second bodyside liner layer, the method intermittently creating bonds between the first and second layers at least about 600 times per minute.

10. A process as in claim 8, the step of periodically creating a physical gap in the nip between the ultrasonic horn and the anvil roll including moving the anvil roll toward the ultrasonic horn at a velocity of no more than about 80 millimeters/second.

11. An ultrasonic system, comprising:
   (a) an ultrasonic horn having a first outer radial surface extending about at least a substantial portion of a circumference thereof, said ultrasonic horn outputting ultrasonic energy;
   (b) an anvil roll having a second outer radial surface extending about at least a substantial portion of a circumference thereof, said anvil roll having a substrate receiving surface for receiving a substrate web to be worked by ultrasonic energy, said substrate receiving surface cooperating with said ultrasonic horn to form a close relationship comprising a nip between said ultrasonic horn and said anvil roll for passage of the substrate web therethrough; and (c) actuator apparatus arranged to interact with said ultrasonic horn and said anvil roll, and, during operation of said ultrasonic system, to assist in positioning the first outer radial surface of said ultrasonic horn substantially in engaging contact with said anvil roll, thereby to bond the substrate web passing the first outer radial surface, said actuator apparatus periodically displacing the first outer radial surface of said ultrasonic horn from the engaging contact with said anvil roll, thus creating a physical gap between said ultrasonic horn and the substrate web on said anvil roll, and subsequently returning said ultrasonic horn to said anvil roll, and thereby re-establishing the engaging contact with said anvil roll.

12. An ultrasonic system as in claim 11 wherein said maximum physical gap comprises no more than about 2 millimeters.

13. An ultrasonic system as in claim 11 wherein said ultrasonic horn has a length, and a central axis of rotation substantially centered with respect to the circumference of said ultrasonic horn, and wherein said ultrasonic horn rotates about the central axis of rotation.

14. An ultrasonic system as in claim 11 wherein said anvil roll has a length, and a central axis substantially centered with respect to the circumference of said anvil roll, and wherein said anvil roll rotates about the central longitudinal axis.

15. An ultrasonic system as in claim 11 wherein the substrate receiving surface travels at a surface speed of at least 300 meters/minute.

16. An ultrasonic system as in claim 11, said actuator apparatus comprising a cam mechanism.

17. An ultrasonic system as in claim 16, said cam mechanism comprising a cam track secured about a central longitudinal axis of said anvil roll and a cam follower, said cam follower contacting said cam track to displace said ultrasonic horn from engaging contact with said anvil roll.

18. An ultrasonic system as in claim 11, said anvil roll including a first gear thereon, said first gear rotating in response to rotation of said anvil roll, said actuator apparatus including a second gear mounted to a first end of a shaft and an elliptically shaped cam mounted at a second end of said shaft, said second gear being rotatably responsive to said first gear, said cam periodically changing the position of said ultrasonic horn relative to said anvil roll in response to rotation of said first and second gears, thus to displace or re-establish the engaging contact between said ultrasonic horn and said anvil roll.

19. An ultrasonic system as in claim 18 wherein said elliptically shaped cam, during rotation of said cam, moves said ultrasonic horn no more than about 2 millimeters away from said anvil roll.

20. An ultrasonic system as in claim 18, said first gear and said second gear moving away from each other in response to said cam shifting the position of said ultrasonic horn, teeth of said first gear continuing to contact and drive teeth of said second gear while said first and second gears are thus moved away from each other.

21. An ultrasonic system as in claim 11, wherein the first outer radial surface defines a substantially constant radius, extending substantially about the circumference of said ultrasonic horn.

22. An ultrasonic system as in claim 11 wherein said ultrasonic horn has a substantially cylindrical shape.

23. An ultrasonic system as in claim 11 wherein the second outer radial surface defines a substantially constant radius, extending substantially about the circumference of said anvil roll.

24. An ultrasonic system as in claim 11 wherein said anvil roll is in a fixed position, and said actuator apparatus moves said ultrasonic horn relative to said anvil roll.

25. An ultrasonic system as in claim 11 wherein said ultrasonic horn is in a fixed position, and said actuator apparatus moves said anvil roll relative to said ultrasonic horn.

26. An ultrasonic system as in claim 11 wherein said ultrasonic horn rotates, and, in combination with said anvil roll, applies a compressive force to the substrate web in the nip during the engaging contact.

27. An ultrasonic system, comprising:

(a) a rotary ultrasonic horn having a length, and a first central axis of rotation along the length of said ultrasonic horn, said rotary ultrasonic horn outputting ultrasonic energy;

(b) an anvil roll having an outer radial surface comprising a substrate-moving surface, said anvil roll cooperating with said rotary ultrasonic horn to form a close relationship comprising a nip between said rotary ultrasonic horn and said anvil roll at the substrate-receiving surface; and (c) cam apparatus arranged to interact with said ultrasonic horn and said anvil roll, said cam apparatus periodically displacing said ultrasonic horn and said anvil roll from engaging contact with each other, thus creating a physical gap between said ultrasonic horn and the combination of the substrate web and said anvil roll, such that said ultrasonic horn intermittently bonds a substrate web traversing in the nip between said ultrasonic horn and said anvil roll.

28. An ultrasonic system as in claim 27, said ultrasonic system including a load governor mechanism to relieve force on said ultrasonic horn when the force otherwise imposed on said ultrasonic horn is greater than about 900 Newtons.

29. An ultrasonic system as in claim 27, said ultrasonic system including a micro adjustment apparatus to vary the length of bonds as the substrate web moves through the nip in the machine direction.

30. An ultrasonic system as in claim 27, the maximum physical gap comprising from about 0.2 millimeter to about 1 millimeter between said ultrasonic horn and said anvil roll.

31. An ultrasonic system, comprising:

(a) a rotary ultrasonic horn having a first central axis of rotation;

(b) an anvil roll cooperating with said rotary ultrasonic horn to form a close relationship comprising a nip between said rotary ultrasonic horn and said anvil roll; and (c) actuator apparatus arranged to move at least one of said ultrasonic horn and said anvil roll with respect to each other, said actuator apparatus periodically moving one of said ultrasonic horn and said anvil roll away from the other of said ultrasonic horn and said anvil roll, and thus creating a physical separation between said ultrasonic horn and the combination of said anvil roll and any substrate web on said anvil roll, and returning said ultrasonic horn and said anvil roll into engaging contact with each other, with such substrate web therebetween, such that said ultrasonic system intermittently bonds such substrate web as such substrate web traverses the nip between said ultrasonic horn and said anvil roll, and does not bond such substrate web when said ultrasonic horn and said anvil roll are thus separated from each other, the physical separation between said ultrasonic horn and the combination of such substrate web and said anvil roll, and the approach velocity of one of said ultrasonic horn and said anvil roll, controlled by said actuator apparatus, in a direction toward the other of said ultrasonic horn and said anvil roll, being such as to avoid harmful impact loading of one of said ultrasonic horn and said anvil roll against the other of said ultrasonic horn and said anvil roll.

32. An ultrasonic system as in claim 31, the physical separation between said ultrasonic horn and the combination of such substrate web and said anvil roll comprising no more than about 2 millimeters.

33. An ultrasonic system as in claim 32, the approach velocity between said ultrasonic horn and said anvil roll comprising no more than about 80 millimeters/second.

34. An ultrasonic system as in claim 32, the approach velocity between said ultrasonic horn and said anvil roll comprising no more than about 30 millimeters/second.

35. An ultrasonic system as in claim 31, the approach velocity of said actuator apparatus avoiding deleterious bounce between said anvil roll and said ultrasonic horn, thereby enhancing useful life of said anvil roll and said ultrasonic horn.

36. An ultrasonic system, comprising:

(a) an ultrasonic horn outputting ultrasonic energy; and (b) an anvil roll receiving a substrate web to be worked by ultrasonic energy, said anvil roll cooperating with said ultrasonic horn to form a close relationship comprising a nip between said ultrasonic horn and said anvil roll for passage of such substrate web therethrough; and (c) actuator apparatus arranged to interact with said ultrasonic horn and said anvil roll, and, during operation of said ultrasonic system, to assist in positioning said ultrasonic horn and said anvil roll in loading position with respect to each other such that the ultrasonic energy bonds the substrate web, said actuator apparatus periodically moving one of said ultrasonic horn and said anvil roll a distance away from the other of said ultrasonic horn and said anvil roll, the distance causing a physical separation of from about 0.2 millimeter to about 2 millimeters between said ultrasonic horn, and the substrate web on said anvil roll.

37. An ultrasonic system as in claim 36, the maximum physical separation between said ultrasonic horn and said anvil roll, including the substrate web thereon, comprising from about 0.3 millimeter to about 0.7 millimeter.

38. An ultrasonic system as in claim 36, said anvil roll comprising a substrate-receiving surface moving through the nip at a surface speed of at least 300 meters per minute.

39. An ultrasonic system as in claim 38, the substrate web comprising at least first and second layers, said ultrasonic system creating bonds between the first and second layers at least about 600 times per minute.

* * * * *

UNITED STATES PATENT AND TRADEMARK OFFICE
CERTIFICATE OF CORRECTION

PATENT NO.    : 6,123,792
DATED         : September 26, 2000
INVENTOR(S)   : Jeffrey J. Samida, et al.

It is certified that error appears in the above-identified patent and that said Letters Patent is hereby corrected as shown below:

Column 13,
Line 61, delete "n" and insert -- in -- in place thereof.

Column 14,
Line 6, after the first occurrence of "force" insert -- , --.

Column 15,
Line 43, delete "having" and insert -- Having -- in place thereof.

Signed and Sealed this

Sixth Day of November, 2001

*Attest:*

*Nicholas P. Godici*

*Attesting Officer*

NICHOLAS P. GODICI
*Acting Director of the United States Patent and Trademark Office*